US010148057B2

(12) United States Patent
Kopf

(10) Patent No.: US 10,148,057 B2
(45) Date of Patent: Dec. 4, 2018

(54) MICROCHIP LASER

(71) Applicant: Daniel Kopf, Rothis (AT)

(72) Inventor: Daniel Kopf, Rothis (AT)

( * ) Notice: Subject to any disclaimer, the term of this patent is extended or adjusted under 35 U.S.C. 154(b) by 5 days.

(21) Appl. No.: 15/318,764

(22) PCT Filed: Jun. 23, 2015

(86) PCT No.: PCT/AT2015/000090
§ 371 (c)(1),
(2) Date: Dec. 14, 2016

(87) PCT Pub. No.: WO2016/004446
PCT Pub. Date: Jan. 14, 2016

(65) Prior Publication Data
US 2017/0133815 A1 May 11, 2017

(30) Foreign Application Priority Data

Jul. 7, 2014 (AT) .................................. A 543/2014

(51) Int. Cl.
*H01S 3/06* (2006.01)
*H01S 3/08* (2006.01)
(Continued)

(52) U.S. Cl.
CPC ........ *H01S 3/0627* (2013.01); *H01S 3/08036* (2013.01); *H01S 3/08054* (2013.01);
(Continued)

(58) Field of Classification Search
CPC .. H01S 3/0627; H01S 3/1118; H01S 3/08054; H01S 3/1673; H01S 3/1611; H01S 3/08036
See application file for complete search history.

(56) References Cited

U.S. PATENT DOCUMENTS 6,373,604 B1 *  4/2002  Xie ...................... G02B 6/272
                                                         398/79
9,124,064 B2   9/2015  Kopf
(Continued)

FOREIGN PATENT DOCUMENTS

DE    102012005492    9/2013
EP         1978611    10/2008
WO      2011147799    12/2011

OTHER PUBLICATIONS

RP Photonics Encyclopedia "Microchip Lasers", 2 pages, downloaded Jun. 25, 2014 (admitted prior art).
(Continued)

*Primary Examiner* — Yuanda Zhang
(74) *Attorney, Agent, or Firm* — Volpe and Koenig, P.C.

(57) ABSTRACT

The invention relates to a microchip laser having a monolithic resonator (1) which has a birefringent laser crystal (2), wherein a laser beam (9) decoupled from the resonator, (1) which has a laser wavelength, exits the resonator (1) along a laser beam axis (12) and the length (L) of the resonator (1) is less than 150 μm based on a direction of the laser beam axis (12). The laser crystal (2) has a thickness (D) based on the direction of the laser beam axis (12) such that, in the case of a light beam (16) having the laser wavelength occurring in the direction of the laser beam axis (12) being incident on the laser crystal (2) between the ordinary and extraordinary beam (17, 19), in which the light beam (16) is divided in the laser crystal (2), a phase shift in the range of $\pi/2 +/- \pi/4$ occurs in a single pass through the laser crystal (2).

12 Claims, 5 Drawing Sheets

(51) Int. Cl.
- *H01S 3/10* (2006.01)
- *H01S 3/113* (2006.01)
- *H01S 3/11* (2006.01)
- *H01S 3/16* (2006.01)
- *H01S 3/04* (2006.01)
- *H01S 3/042* (2006.01)

(52) U.S. Cl.
CPC .......... *H01S 3/10061* (2013.01); *H01S 3/113* (2013.01); *H01S 3/1118* (2013.01); *H01S 3/1611* (2013.01); *H01S 3/1673* (2013.01); *H01S 3/042* (2013.01); *H01S 3/0405* (2013.01); *H01S 3/0621* (2013.01); *H01S 3/1671* (2013.01)

(56) References Cited

U.S. PATENT DOCUMENTS

| | | | | |
|---|---|---|---|---|
| 2007/0291810 A1* | 12/2007 | Luo | .................. | H01S 3/0627 372/50.121 |
| 2008/0080571 A1* | 4/2008 | Ma | .................. | H01S 3/0627 372/22 |
| 2010/0074280 A1* | 3/2010 | Ma | .................. | H01S 3/08031 372/19 |
| 2013/0064262 A1* | 3/2013 | Kopf | .................. | H01S 3/0612 372/45.013 |

OTHER PUBLICATIONS

RP Photonics Encyclopedia "Monotlithic Solid-State Lasers", 2 pages, downloaded Jun. 25, 2014 (admitted prior art).

RP Photonics Encyclopedia "Vanadate Lasers", 3 pages, downloaded Dec. 13, 2016 (admitted prior art).

Braun, B. "56-PS Passively Q Switched Diode-Pumped Microchip Laser", Optics Letters, Optical Society of America, US, vol. 22, No. 6, pp. 381-383, Mar. 15, 1997.

Bernard, Benjamin et al. "26 ps pulses from a passively Q-switched microchip laser", Proceedings of SPIE, SPIE—International Society for Optical Engineering, US, vol. 8960, pp. 8960ID-8960ID-7, Mar. 4, 2014.

Mehner, Eva, et al. "Sub-20-ps pulses from a passively Q-switched microchip laser at 1 MHz repetition rate", Optics Letters, 2014 Optical Society of America, vol. 39, No. 10, pp. 2940-2943, May 15, 2014.

Pallmann, W.P., et al., "Novel Ultrafast Vertically Emitting Semiconductor Lasers", Optical Communication (ECOC), 2010 36TH European Conference and Exhibition on, IEEE, Piscataway, NJ, USA, pp. 1-3, Sep. 19, 2010.

* cited by examiner

| Layer | d [nm] | t [nm] | QWOT | M |
|---|---|---|---|---|
| 1 | 113.667 | 266 | 1 | TiO2 |
| 2 | 180.262 | 266 | 1 | SiO2 |
| 3 | 113.667 | 266 | 1 | TiO2 |
| 4 | 180.262 | 266 | 1 | SiO2 |
| 5 | 113.667 | 266 | 1 | TiO2 |
| 6 | 180.262 | 266 | 1 | SiO2 |
| 7 | 113.667 | 266 | 1 | TiO2 |
| 8 | 180.262 | 266 | 1 | SiO2 |
| 9 | 113.667 | 266 | 1 | TiO2 |
| 10 | 180.262 | 266 | 1 | SiO2 |
| 11 | 33250 | 71820 | 270 | Nd:YVO4 ∥c |
| 12 | 170 | 250.857 | 0.943071 | SiO2 |
| 13 | 127.008 | 297.218 | 1.11736 | TiO2 |
| 14 | 193.281 | 285.211 | 1.072222 | SiO2 |
| 15 | 115.574 | 270.463 | 1.016777 | TiO2 |
| 16 | 179.236 | 264.486 | 0.994309 | SiO2 |
| 17 | 115.56 | 270.429 | 1.016651 | TiO2 |
| 18 | 193.299 | 285.237 | 1.07232 | SiO2 |
| 19 | 127.008 | 297.22 | 1.117368 | TiO2 |
| 20 | 183.728 | 271.115 | 1.019229 | SiO2 |

MICROCHIP LASER

BACKGROUND

The invention relates to a microchip laser comprising a monolithic resonator having a birefringent laser crystal, wherein a laser beam which has a laser wavelength and which is decoupled from the resonator emerges from the resonator along a laser beam axis and the length of the resonator in relation to the direction of the laser beam axis is shorter than 150 μm.

Microchip lasers are solid-state lasers comprising a monolithic resonator and distinguished by a particularly small construction. End mirrors of the resonator are formed by coating the active laser medium and/or an optical element having or forming an end mirror, for example a SESAM (Semiconductor saturable absorber mirror), is cohesively connected to the active laser medium. Such connection techniques are known as "bonding".

Short pulses can easily be formed by microchip lasers due to the short resonator lengths. Hence, pulses with pulse lengths of less than one nanosecond or else less than 100 picoseconds, in extreme cases of less than 20 picoseconds, may be achieved by means of Q-switching. Such pulses are of interest, for example, for micro material processing.

Existing mode-coupled lasers, by means of which such short pulses may be generated, have a substantially larger embodiment. Typical resonator lengths are more than 1 m and such resonators may be housed in a cube with an edge length of more than 10 cm as a result of multiple folding. By contrast, a microchip laser resonator may be housed in a cube with an edge length of less than 1 mm.

Gain switching may also be carried out for a microchip laser, wherein pulses with pulse durations in the nanosecond range, or else shorter, may be generated. In principle, a microchip laser may also be operated continuously (=in the cw mode).

Microchip lasers have a potentially cost-effective production because a planar laser structure may be produced in a batch process (wafer process) such that more than 100 laser resonators may by all means be obtained from an area of 10 mm×10 mm.

A particular stability of a microchip laser is facilitated by the monolithic structure.

Microchip lasers of the type set forth at the outset with particularly short pulse durations emerge from WO 2011/147799 A1 and from Mehner, E., et al., "Sub-20-ps pulses from a passively Q-switched a laser chip at 1 MHz repetition rate", OPTICS LETTERS, volume 39, number 10, May 15, 2014, 2940-2943. These publications specify further documents in which microchip lasers in which pulses with pulse lengths under 100 ps are achieved by Q-switching are disclosed.

Microchip lasers usually emit at a single frequency in the case of short resonator lengths and low gain bandwidths of the active laser material, i.e. the laser beam decoupled from the resonator has a defined laser wavelength. The short resonator length leads to a large "free spectral range", i.e. a large distance between adjacent wavelengths which are resonant in the resonator.

A laser crystal formed by a vanadate, in particular Nd3+:YVO4, is often used as active laser medium for microchip lasers. As laser material, Nd3+:YVO4 has advantageous properties such as a comparatively high small signal gain and good absorption of the pumping radiation. Nd3+:YVO4 is a birefringent crystal, with previous experience having shown that a microchip laser comprising Nd3+:YVO4 as a laser crystal may laser with a polarization corresponding to the ordinary ray or corresponding to the extraordinary ray.

Birefringent crystals are optically anisotropic, in the direction of the crystal optical axis in the case of optically uniaxial birefringent crystals with an exception for a light incidence. In the case of optical uniaxial birefringent crystals, the refractive index is independent of the polarization direction of the light in the case of an incidence parallel to the only crystal optical axis. For an incidence of light at an angle to the crystal optical axis, the light beam is divided into two linearly polarized sub-beams, the polarization directions of which are at right angles to one another and which are referred to as ordinary ray and extraordinary ray. The refractive indices differ for the ordinary ray and extraordinary ray, with the difference between the refractive indices assuming the maximum value thereof in the case of a direction of incidence of light at right angles to the crystal optical axis. In the case of such an incidence of light at right angles to the crystal optical axis and onto an entrance surface of the birefringent crystal at right angles to the direction of incidence of light, there is no spatial separation here between the ordinary and extraordinary rays polarized at right angles to one another.

A birefringent crystal may also have more than one crystal optical axis.

SUMMARY

It is an object of the invention to provide an advantageous microchip laser of the type set forth at the outset, which has a high stability of the polarization direction of the laser beam decoupled from the resonator. This is achieved by way of a microchip laser having one or more features of the invention.

In the case of a microchip laser in accordance with the invention, the laser crystal has such a thickness in the direction of the laser beam axis that, in the case of an incidence on the laser crystal of a light beam which has the laser wavelength taking place in the direction of the laser beam axis, a phase shift lying in the range of $\pi/2\pm\pi/4$, preferably $\pi/2\pm\pi/8$, occurs between the ordinary ray and the extraordinary ray, into which the light beam is divided in the laser crystal, during a single passage through the laser crystal. The birefringent laser crystal thus behaves like a lambda/4 plate in relation to the ordinary ray and the extraordinary ray, with a deviation thereof within the aforementioned range being possible.

As a result of the embodiment according to the invention, a polarization selection of the decoupled laser beam with a high tolerance in relation to external influences, such as temperature, or else in relation to production deviations, e.g. in respect of the formed length of the resonator, is achieved.

The length of the resonator in the direction of the laser beam axis is 150 μm or less, preferably 100 μm or less, particularly preferably 50 μm or less. As a result of such a short resonator, there is a large "free spectral range", i.e. a large distance between the wavelengths which are resonant in the resonator, which is important for a stable suppression of the unwanted polarization direction. Moreover, short pulse lengths may be achieved in a simple manner in the case of such a short resonator, advantageously by means of passive Q-switching, wherein, in particular, a SESAM may be used as an end mirror.

In principle, a laser according to the invention may be operated as a continuous wave laser. However, an embodiment as a pulsed laser is advantageous for many applications. The desired pulse duration depends on the application.

There are applications in which pulse lengths in the ns-range or else in the range 100 ps-1 ns are advantageous. By way of example, such pulse durations may be achieved by gain switching of the optical pump arrangement.

In advantageous embodiments, the pulse duration of the pulses may be less than 100 ps, preferably less than 50 ps, with pulse durations of less than 20 ps being conceivable and possible. Here, the pulse energy may be greater than 10 nJ, or else greater than 30 nJ. In particular, such short pulse durations may be achieved by the passive Q-switching already mentioned above.

If the present document refers to pulse durations, these are related to the full width at half maximum (FWHM) of the intensity.

In an advantageous embodiment of the invention, the laser crystal is Nd3+:YVO4.

Instead of YVO4, other vanadates may also be considered to form the laser crystal, e.g. Nd3+:GdVO4 or ND3+:GdYVO4. Instead of vanadates, other birefringent crystals with appropriate doping, e.g. Nd, which have laser-active properties, e.g. LSB, may also be used as a laser crystal.

The layer system forming the resonator is embodied in such a way that a resonance for the desired polarization lies at the maximum of the gain of the laser crystal or only has a small deviation therefrom, preferably of less than 0.5 nm. The wavelength of the decoupled laser beam, for which the laser mode in the laser crystal lies at the maximum of the gain of the laser crystal, is referred to as "amplification wavelength" in this document. For Nd3+:YVO4, this lies at approximately 1064 nm. The bandwidth within which sufficient gain is present in order to generate a laser mode only lies approximately 1 nm around this value.

Advantageously, the laser beam axis, along which the laser beam emerges from the resonator, corresponds to the axis of the laser beam within the resonator and the laser beam axis is at right angles to a crystal optical axis of the laser crystal, with the laser crystal preferably only having one crystal optical axis (=an optical uniaxial embodiment) and therefore being optically isotropic in relation to an incidence parallel to the single crystal optical axis. The difference of the refractive indices for rays with polarizations that are at right angles to one another, corresponding to the ordinary ray and extraordinary ray, has a maximum in such a configuration, in which the axis of the laser beam is at right angles to the crystal optical axis. Here, a light beam entering into the laser crystal parallel to the laser beam axis is not spatially separated into an ordinary ray and extraordinary ray, i.e. the ordinary ray and extraordinary ray coincide but have polarization directions that are at right angles to one another.

In particular, the end mirrors delimiting the resonator at both sides are plane, at least when no pumping radiation is incident into the laser crystal, and at right angles to the laser beam axis. Here, the end faces of the laser crystal, by means of which the laser beam interacts with the end mirrors, are plane, at least when no pumping radiation is incident on the laser crystal, and at right angles to the laser beam axis.

The laser wavelength of the decoupled laser beam advantageously has a very narrow frequency distribution, preferably with a full width at half maximum (FWHM) of the intensity of less than 1 nm, particularly preferably of less than 0.3 nm. The effects of the frequency distribution in respect of the intensity suppression of the unwanted polarization direction may therefore be ignored. If this document refers to the laser wavelength, this, strictly speaking, refers to the maximum of the frequency distribution of the decoupled laser beam.

BRIEF DESCRIPTION OF THE DRAWINGS

Further advantages and details of the invention will be explained below on the basis of the attached drawing. In the drawings.

DETAILED DESCRIPTION OF THE PREFERRED EMBODIMENTS

Figure 1:
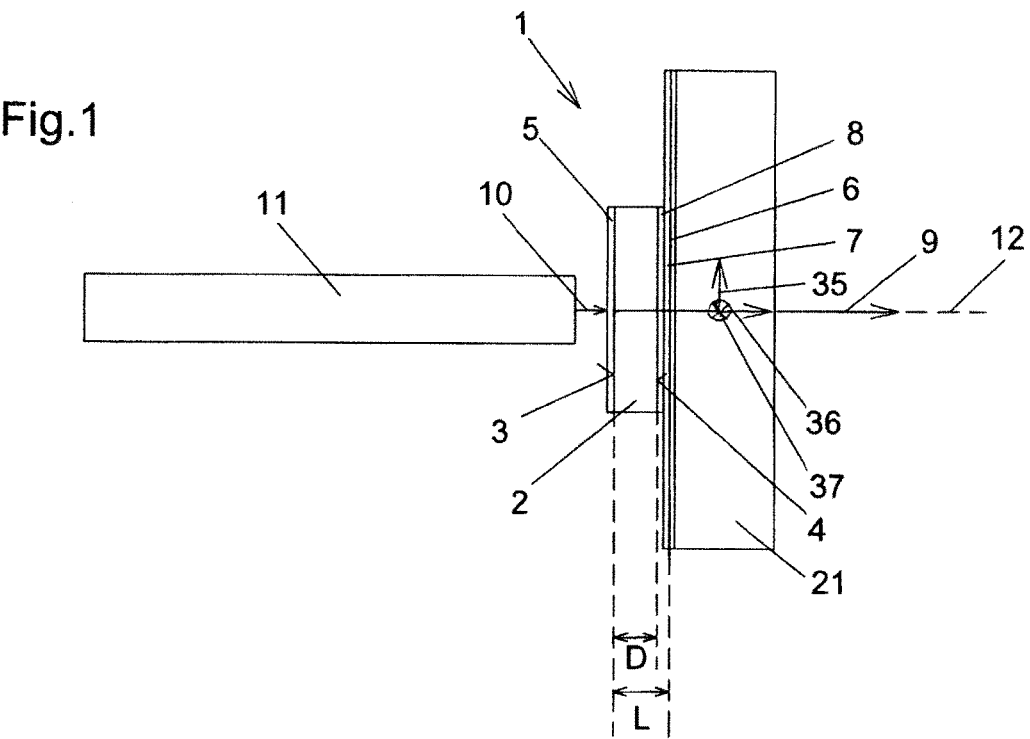
FIG. 1 shows a schematic illustration of a microchip laser in accordance with a first embodiment of the invention.
Figure 2:
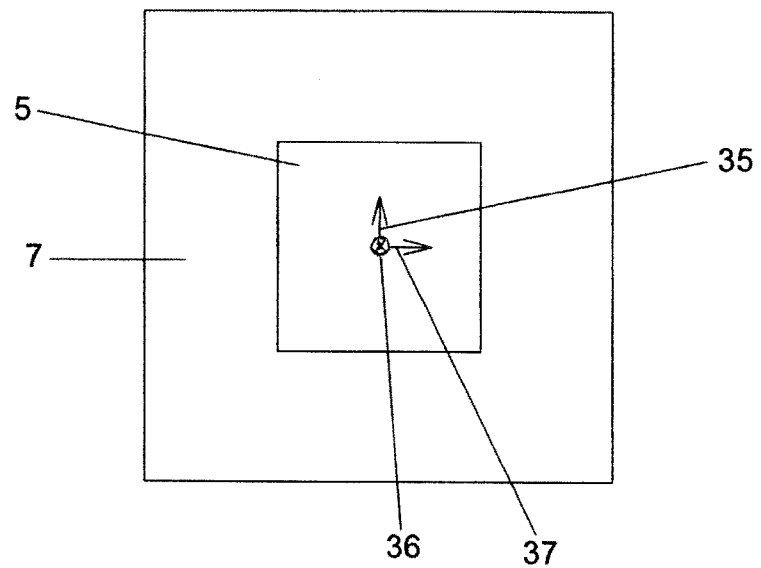
FIG. 2 shows a view of the resonator in the direction of the laser beam axis.

A possible exemplary embodiment for a microchip laser in accordance with the invention is depicted schematically in FIGS. 1 and 2. The microchip laser has a resonator 1, which is embodied in the form of a monolithic block. The laser-active medium of the resonator 1 is the laser crystal 2. The laser crystal 2 has end surfaces 3, 4 lying opposite one another. Through these end surfaces lying opposite one another, a laser beam (=laser mode) forming in the laser crystal 2 during operation of the laser interacts with end mirrors 5, 6 of the resonator 1. Here, the first end mirror 5 is formed by an optical coating of the end surface 3 of the laser crystal 2. In the exemplary embodiment, the second end mirror 6 is embodied in the form of a Bragg mirror and part of a SESAM, which moreover has an absorber layer 7 which forms a saturable absorber. A reflection layer 8 for the pumping radiation, which is at least partly transmissive therefor, e.g. 30%, is situated between the absorber layer 7 of the SESAM and the laser crystal 2.

The reflection layer 8 is applied to the resonator 1 as an optical coating. In this exemplary embodiment, the SESAM comprising the absorber layer 7 and the second end mirror 6 is embodied on a carrier substrate 21 in the form of GaAs (e.g. 0.4 mm thick). The unit comprising the SESAM and the carrier substrate 21 is connected by bonding, i.e. in a cohesive manner, to the resonator 1 coated with the reflection layer 8.

The second end mirror 6 has a partly reflecting embodiment in order to decouple the laser beam 9.

The carrier substrate 21 itself does not constitute a part of the resonator 1. Expediently, an antireflection coating for the laser beam is applied to the side of the carrier substrate 21 facing away from the laser crystal 2.

An embodiment with a carrier substrate 21 may also be dispensed with in other exemplary embodiments.

In the exemplary embodiment, the first end mirror 5 serves to couple the pumping radiation and, to this end, has an embodiment which is as transmissive as possible to the pumping radiation 10, while it is highly reflective to light with the optical frequency of the laser radiation.

In order to emit the pumping radiation, use is made of a laser diode or laser diode array, with the pumping radiation being fed to the resonator in the schematically illustrated exemplary embodiment by means of an optical waveguide 11, of which one end is schematically depicted in FIG. 1. An arrangement of the laser diode or of the laser diode array directly in front of the resonator 1 is also conceivable and possible. Additional lenses for focusing the pumping radiation may be provided, but these are not depicted in the schematic FIG. 1.

Advantageously, the diameter of the pumping radiation in the laser crystal is less than 100 μm, preferably less than 50 μm, particularly preferably less than 30 μm, in relation to the full width at half maximum (i.e. FWHM) of the intensity. Here, the diameter of the pumping beam may also be matched to the thickness D of the laser crystal 2, wherein a pumping volume with largely the same diameter and same length may be obtained.

The resonator 1 with a monolithic embodiment may have further and/or other optical elements.

Here, "monolithic" means that the elements forming the resonator are cohesively connected to one another, in particular by means of conventional bonding. By way of example, bonding is known in the form of diffusion bonding, wringing or adhesive bonding (by means of an adhesive layer).

The resonator 1 is a standing-wave resonator. The end surfaces 3, 4 of the laser crystal 2 are plane and lie parallel to one another in the shown microchip laser, at least for as long as no pumping radiation is incident into the laser crystal 2. Likewise, the end mirrors 5 and 6 are plane and lie parallel to one another. During the operation of the laser, when the pumping radiation 10 is incident into the laser crystal 2, a thermal lens forms, including a certain amount of arching of the end surfaces 3, 4, and hence of the end mirrors 5, 6. The formation of laser modes of microchip lasers taking into account the thermal lens is known.

During operation, microchip lasers are usually kept in a predetermined operating temperature range by means of heating and/or cooling elements, for example by means of a Peltier element. In the laser according to the invention, provision is preferably made of at least one such heating and/or cooling element to keep the microchip laser in a predetermined temperature range during operation, but it is not depicted in FIG. 1 for reasons of simplicity.

The laser beam 9 decoupled from the resonator 1 has a laser beam axis 12. In the resonator 1, the axis of the laser beam (=of the laser mode) likewise corresponds to the laser beam axis 12.

In the exemplary embodiment, the laser crystal 2 is Nd3+:YVO4. Such a laser crystal is birefringent. YVO4 has a-axes 35, 36 at right angles to one another and a c-axis 37 at right angles to the a-axes 35, 36, cf. FIGS. 1 and 2. YVO4 is birefringent and, in so doing, optically uniaxial, with it having the c-axis 37 as only crystal optical axis. Hence, YVO4 is optically isotropic in relation to the c-axis 37. Thus, it has the same refractive index for polarization directions of the light parallel to the two a-axes 35, 36.

In the case of an incidence of an unpolarized light beam at an angle to the crystal optical axis, i.e. in relation to the c-axis 37 in the exemplary embodiment, there is a split of the light beam into sub-beams polarized at right angles to one another, corresponding to the ordinary ray and extraordinary ray. In the case of an incidence of an unpolarized light beam at right angles to the crystal optical axis, i.e. in the plane of the a-axes 35, 36 in the exemplary embodiment, for example parallel to one of the a-axes 35, 36, with the entrance surface being at right angles to the direction of incidence of the light beam, there is no spatial separation between the ordinary ray and extraordinary ray; thus, these coincide but, however, have polarization directions lying parallel to the crystal optical axis (for the extraordinary ray) and at right angles thereto (for the ordinary ray), that is to say parallel to the c-axis 37 and parallel to the (other) a-axis 35 in the exemplary embodiment.

The axis of the laser beam 9 in the laser crystal 2 of the resonator 1 lies at right angles to the crystal optical axis, parallel to the a-axis 36 in the exemplary embodiment, wherein the axis of the laser beam 9 in the laser crystal 2 could also lie in a different direction at right angles to the crystal optical axis, i.e. in the plane spanned by the a-axes 35, 36 in the exemplary embodiment, for example parallel to the other a-axis 35. Thus, in principle, the laser beam 9 may assume a polarization parallel to the crystal optical axis, the c-axis 37 in the exemplary embodiment, or at right angles thereto, parallel to the a-axis 35 in the exemplary embodiment. For which of these polarizations a laser beam (laser mode) is incident and decoupled from the resonator 1 is explained further below.

The mode condition must be satisfied so that a laser mode may form in the resonator:

$$L = 1/2 * m * \text{laser wavelength}/n,$$

where L denotes the resonator length, m is an integer value and denotes the mode number and n denotes the refractive index. Since the laser crystal is birefringent, the refractive indices no, ne for the polarizations corresponding to the ordinary ray and extraordinary ray are different. The amplification wavelength (corresponding to the definition above) is inserted for the laser wavelength. A value lying sufficiently close thereby (within the gain bandwidths of e.g. ±1 nm) would also still lead to a laser mode. However, the intensity maximum is reached at the maximum gain.

For YVO4, the refractive index ne for polarization parallel to the c-axis is 2.16 and the refractive index no for polarization parallel to the a-axis is 1.96 (in relation to the amplification wavelength of 1064 nm). Thus, in this case, the refractive index difference is approximately 0.2, and hence approximately 10%.

Figure 3:
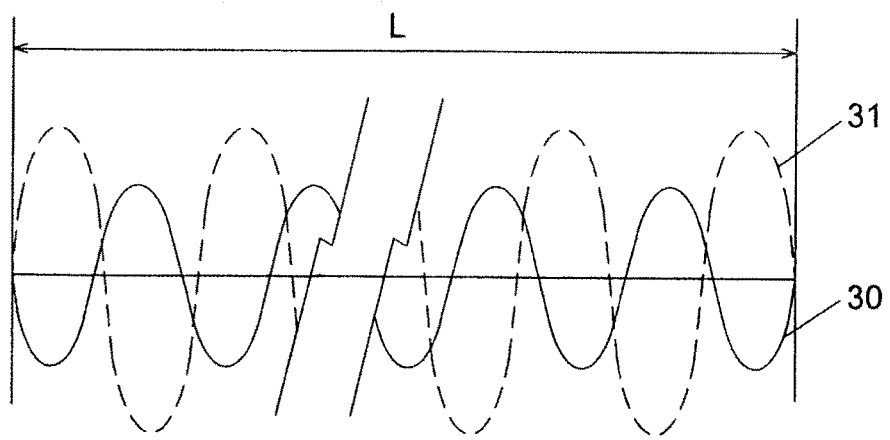
FIG. 3 shows a schematic illustration of the E-fields for a case where the resonator would be resonant in the case of a laser wavelength corresponding to the amplification wavelength of the laser crystal for mutually perpendicular linearly polarized laser beams, as a comparison example.

FIG. 3 depicts a length L of the resonator in an exemplary manner, at which length resonance occurs both for standing waves with a polarization parallel to the c-axis 37 and parallel to the a-axis 35. The amplification wavelength, e.g. 1064 nm for Nd3+:YVO4, is accordingly compressed in the resonator in accordance with the refractive index for the respective polarization. In FIG. 3, the full line 30 depicts the E-field for the polarization parallel to the c-axis 37, i.e. the polarization in accordance with the extraordinary ray, and the dashed line 31 depicts the E-field for the polarization parallel to the a-axis 35, i.e. for the polarization corresponding to the ordinary ray, in each case along the laser beam axis 12. As a result of the higher refractive index, the wavelength for the polarization of the extraordinary ray is compressed in relation to that of the ordinary ray.

Hence, the formation of a mode is possible, as a matter of principle, for both polarizations in the situation corresponding to FIG. 3. This leads to instabilities. Which mode will in fact form depends on small changes in the parameters, for example the temperature.

In FIG. 3, just like in the mode condition specified above, the assumption is made for simplicity and for elucidating purposes that the material of the laser crystal is present over the whole length of the resonator. In fact, a certain part of the length L of the resonator may be formed by layers of different materials, for example the absorber layer 7 or reflection layer 8. The refractive index present in these regions should be taken into account for the mode condition in a more accurate consideration. If these additional layers are not birefringent, the wavelengths for the two polarization directions are the same in these regions.

Figure 4:
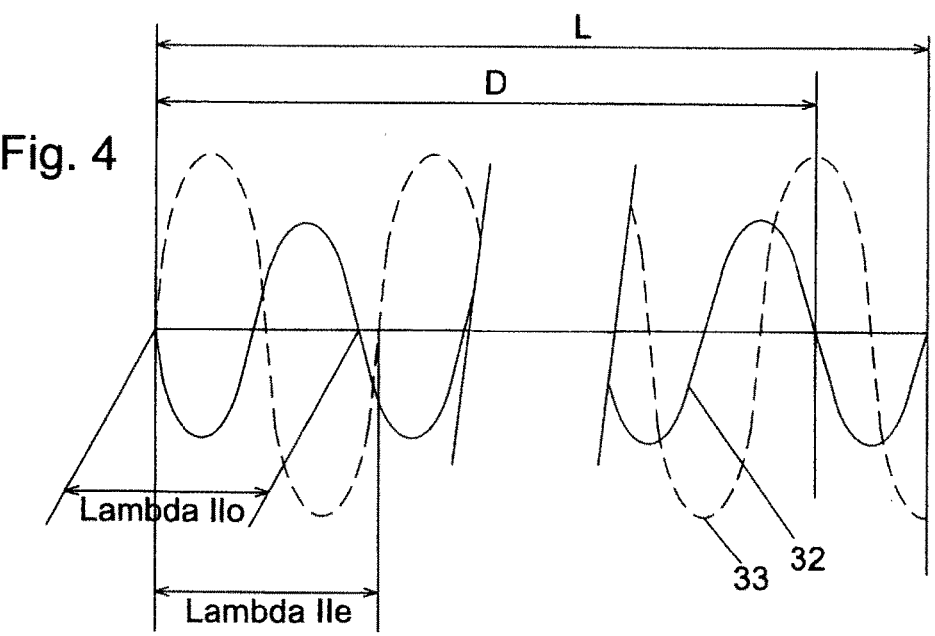
FIG. 4 shows a schematic illustration of the E-fields of the ordinary ray and extraordinary ray for a light beam having the laser wavelength incident on the laser crystal in the direction of the laser beam axis.

The situation for a laser embodied according to the invention emerges from FIG. 4. The full line 32 corresponds to the E-field for the laser beam which is polarized in the direction of the extraordinary ray, i.e. in the direction of the c-axis 37 in the exemplary embodiment, along the laser beam axis 12. The resonator is resonant for this laser beam (the mode has nodes at the two ends of the resonator). In other words, the mode condition is satisfied for this laser beam which, after being decoupled, has the laser wavelength corresponding to the amplification wavelength, i.e. approximately 1064 nm for Nd3+:YVO4.

By contrast, the mode condition has not been satisfied for the polarization corresponding to the ordinary ray, i.e. parallel to the a-axis 35 in the exemplary embodiment. The E field for an imaginary mode with the polarization corresponding to the ordinary ray would have a node at one end of the resonator but an anti-node at the other end. The dashed line 32 in FIG. 4 elucidates this situation. Such a mode is therefore suppressed and the decoupled laser beam has a polarization in accordance with the extraordinary ray.

FIG. 4 also plots the extent of the laser crystal 2 which the latter has in the direction of the laser beam axis 12, i.e. the thickness D thereof. In the laser crystal 2, the wavelength for the polarization corresponding to the ordinary ray lambda IIo and the wavelength in accordance with the extraordinary ray lambda IIe, specifically for the case of Nd3+:YVO4, is:

Lambda IIo=lambda/no=1064 nm/1.96=542.85 nm

Lambda IIe=lambda/ne=1064 nm/2.16=492.59 nm ("compressed").

Here, lambda is the laser wavelength of the decoupled laser beam 9, which corresponds to the amplification wavelength.

If there is no birefringent material present in the region of the resonator lying outside of the laser crystal, lambda IIo=lambda IIe in this region. Thus, the phase relationship between the E-fields of the modes polarized perpendicular to one another is maintained here. Even if the refractive indices should be different for the two polarizations in the region outside of the laser crystal, the effect may be ignored if the phase shift caused in the region of the resonator lying outside of the laser crystal is sufficiently small, in particular $<\pi/8$, preferably $<\pi/16$.

In FIG. 4, precisely half a wavelength is plotted as difference between L and D for reasons of simplicity. However, this is only depicted symbolically in this way. In practice, the length difference between L and D will generally differ therefrom.

If the assumption is made for the laser crystal with the thickness D that an unpolarized light beam which has the laser wavelength is incident on the laser crystal 2 in the direction of the laser beam axis 12, then the light beam is divided into an ordinary ray and an extraordinary ray in the laser crystal since the laser crystal 2 is birefringent. If the incidence occurs at right angles to the crystal optical axis, at right angles to the c-axis for Nd3+:YVO4, and onto an area of incidence which is at right angles to the incident incoming light, the extraordinary ray and ordinary ray are not spatially separated from one another in this case, but they are polarized at right angles to one another; specifically, the extraordinary ray is polarized in the direction of the crystal optical axis, i.e. in the direction of the c-axis for Nd3+:YVO4, and the ordinary ray is polarized at right angles thereto, i.e. in the plane spanned by the a-axes for Nd3+:YVO4, for example parallel to one of the a-axes.

Figure 5A:
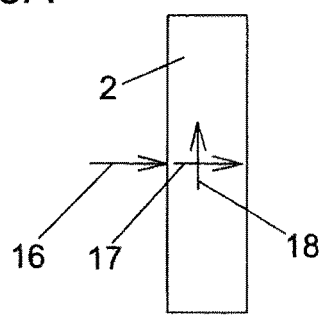
FIGS. 5A and 5B show schematic illustrations of the ordinary ray and extraordinary ray in the case of a light beam incident on the laser crystal in the direction of the laser beam axis.
Figure 5B:
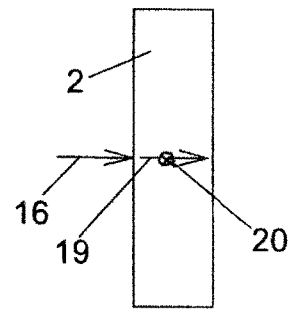

FIG. 5A plots the light beam 16 incident on the laser crystal together with the ordinary ray 17, the polarization of which at right angles to the crystal optical axis is indicated by the arrow 18. FIG. 5B plots the incident light beam 16 together with the extraordinary ray 19, the polarization of which parallel to the crystal optical axis is indicated by the cross 20. The E-field for the extraordinary ray corresponds to the full line 32 over the range of the laser crystal 2 (i.e. over the extent in accordance with D) in FIG. 4 and the E-field of the ordinary ray corresponds to the dashed line 33 over the extent corresponding to D in FIG. 4.

The thickness D of the laser crystal in the direction of the laser beam axis is precisely such in FIG. 4 that the phase angle of the E-field of the extraordinary ray 19 is retarded by a quarter wavelength, i.e. by $\pi/2$, in relation to the phase angle of the ordinary ray 17 at the end of the laser crystal (i.e. at the end of the passage through the laser crystal) in relation to the start of the laser crystal (i.e. before the passage through the laser crystal starts). Thus, the laser crystal 2 acts as a lambda/4 plate for the extraordinary ray in relation to the ordinary ray.

Hence, when the laser mode with the polarization direction corresponding to the extraordinary ray resonates in the resonator, the laser mode with the polarization direction at right angles thereto, i.e. in accordance with the ordinary ray, is suppressed "to the best possible extent" for this thickness D of the laser crystal, i.e. it is as far away as possible from satisfying the mode condition in the resonator.

As already mentioned, the assumption is made here that there are no further phase shifts between the modes outside of the laser crystal or, should there in fact be further phase shifts, these are sufficiently small (preferably less than $\pi/8$, particularly preferably less than $\pi/16$) that they are of no consequence.

A sufficient suppression of the unwanted polarization is still achieved, even in the case of a deviation from the aforementioned embodiment of the laser crystal 2 as a lambda/4 plate, for as long as the deviation is not too large. The magnitude of the admissible deviation also depends on the length of the resonator and the "free spectral range" connected therewith. Due to the longer "free spectral range", a greater deviation may be permitted in the case of a relatively short resonator than in the case of a longer resonator. Thus, for a resonator length of 50 μm or less, it is possible to admit a phase shift between the ordinary ray and the extraordinary ray during a single passage through the laser crystal which lies in the region of $\pm\pi/4$, but preferably deviates less from $\pi/2$ in relation thereto. In the case of a length of the resonator 1 which is at least 50 μm but less than 100 μm, the phase shift expediently lies at least in the range of $\pi/2\pm\pi/6$. If the length of the resonator 1 is at least 100 μm but less than 150 μm, the phase shift expediently lies at least in the range of $\pi/2\pm\pi/8$.

Figures 6, 11:
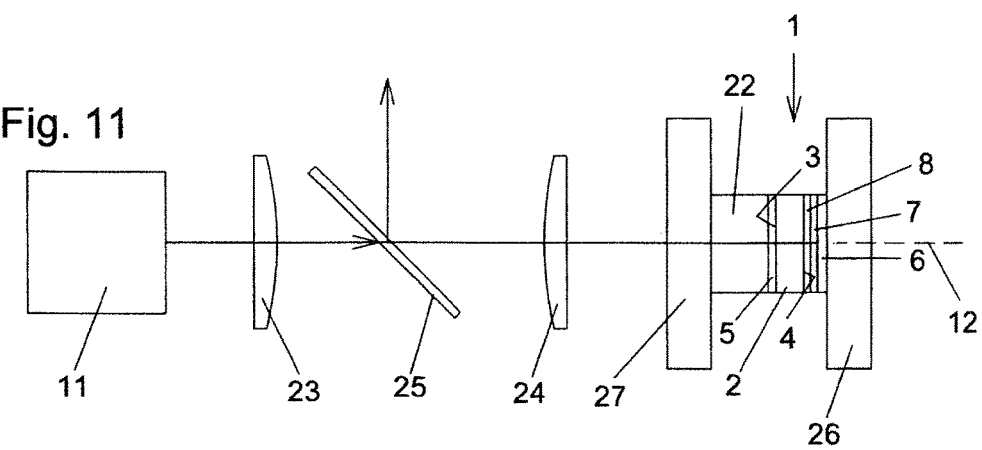
FIG. 6 shows a table for explaining a simulation calculation for a layer system simulating a resonator.
FIG. 11 shows a schematic illustration of a microchip laser according to the invention, in accordance with a further possible embodiment.

Below, results of numerical calculations of the resonance lines of a resonator at two different thicknesses of the laser crystal 2, corresponding to different lengths of the resonator 1 (otherwise, the resonator 1 has the same embodiment), are shown for elucidating purposes. The calculations were carried out for a resonator in accordance with a modified embodiment of a microchip laser, which is schematically depicted in FIG. 11.

The resonator 1 comprises a birefringent laser crystal 2, for example Nd3+:YVO4. An optical coating is applied to the first end surface 3 as a first end mirror 5. It is transmissive to the pumping radiation and partly reflecting for the laser beam. The other end surface 4 is coated with a reflection layer 8 which reflects the pumping radiation but is transmissive to the laser beam. A SESAM is bonded to the laser crystal 2 coated with the reflection layer 8, said SESAM comprising a saturable absorber layer 7 and the second end mirror 6. The reflection layer could be applied prior to the bonding onto the SESAM. Here, the SESAM is applied to a cooling body 26 made e.g. of copper.

In this exemplary embodiment, the laser beam 9 is decoupled by the first end mirror 5. The laser crystal 2 with the optical coating forming the first end mirror 5 is bonded to an undoped YVO4 crystal 22, which lies outside of the resonator. The mechanical processing of the laser crystal 2 for forming the laser crystal 2 with a small thickness D is substantially simplified as a result of the cohesive connection of the laser crystal 2 to the YVO4 crystal 22. A window 27 (with antireflection coating for the pumping radiation and the laser beam) is still applied to the YVO4 crystal 22.

A laser diode or a laser diode array serves as radiation source for the pumping radiation. The transfer may be carried out by means of an optical waveguide 11, of which one end is depicted schematically in FIG. 11. Such an optical waveguide may also be dispensed with. FIG. 11 moreover indicates lenses 23, 24 for focusing the pumping radiation. A dichroic beam splitter 25 serves to separate the laser beam from the pumping radiation in this exemplary embodiment.

Numerical calculations were carried out for a layer system corresponding to the resonator 1 of FIG. 11. However, for simplification purposes, the reflection layer 8 and the absorber layer 7 were omitted. The length L of the resonator 1 therefore corresponds to the thickness D of the laser crystal 2. The table of FIG. 6 describes the system for which the calculations were specifically carried out. In the table, the first column denotes the number assigned to the respective layer. The column d denotes the thickness of the respective layer in nm. The column t denotes the "optical thickness"; this is the thickness t times the refractive index. The column QWOT denotes the optical thickness in relation to the number of quarter wavelengths. Finally, the last column M denotes the material of the respective layer.

The layers 1 to 10 represent a Bragg mirror which is formed by five quarter wavelength pairs (in relation to the wavelength of 1064 nm). The reflectivity of these 10 layers at 1064 nm lies at approximately 98%, i.e. close to a highly reflective element. Increasing the number of layers of the Bragg mirror could still further increase the reflectivity.

Layer 11 represents the laser crystal, Nd3+:YVO4 in the present case. First of all, a thickness of 33.25 μm was considered. The refractive index ne for the polarization in the direction of the extraordinary ray was inserted for the laser crystal 2 in the table of FIG. 6 (symbolized by Nd3+:YVO4 IIc, i.e. 2.16 for the case of Nd3+:YVO4).

Hence, the calculation of the reflectivity of the resonator is carried out for a light beam with a polarization corresponding to the extraordinary ray. For the purposes of calculating the reflectivity for a beam with a polarization corresponding to the ordinary ray, no, i.e. 1.96 for the case of Nd3+:YVO4, is used as refractive index of the laser crystal.

The layers 12 to 20 represent the first end mirror 5 which, in the exemplary embodiment, is virtually completely transmitting at the wavelength 808 nm of the pumping radiation and has a reflectivity of 95% at the laser wavelength of 1064 nm in the exemplary embodiment. In the exemplary embodiment in accordance with FIG. 11, the layer 20 was arranged on YVO4 as a carrier substrate.

The layer materials used here are TiO2 and SiO2, with other materials conventional in coating technology also being possible, e.g. Ta2O5.

Figure 7:
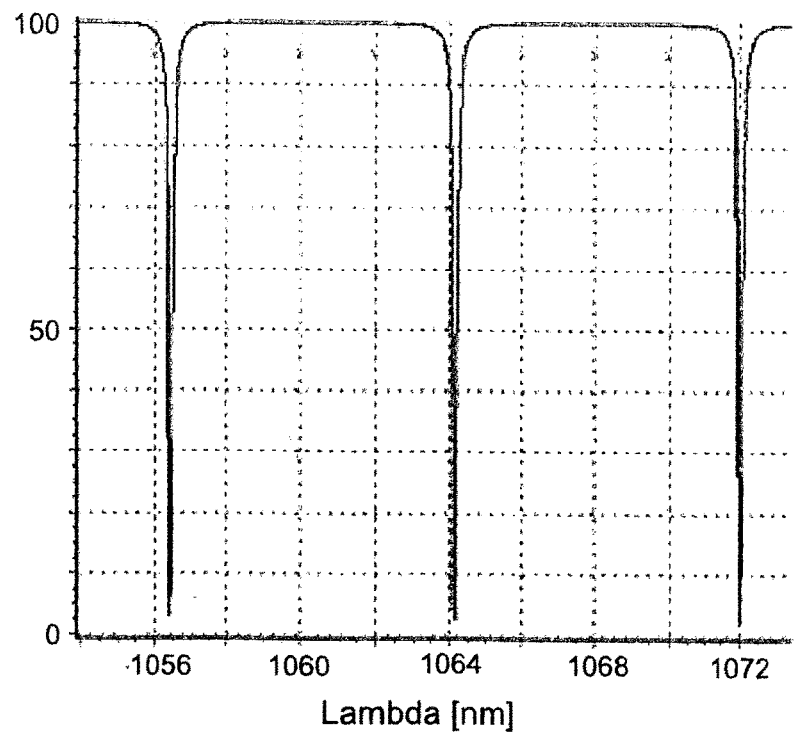
FIGS. 7 and 8 show diagrams for the resonance lines of the resonator for polarizations corresponding to the ordinary ray and extraordinary ray, in the case of a thickness of the laser crystal according to the invention.
Figure 8:
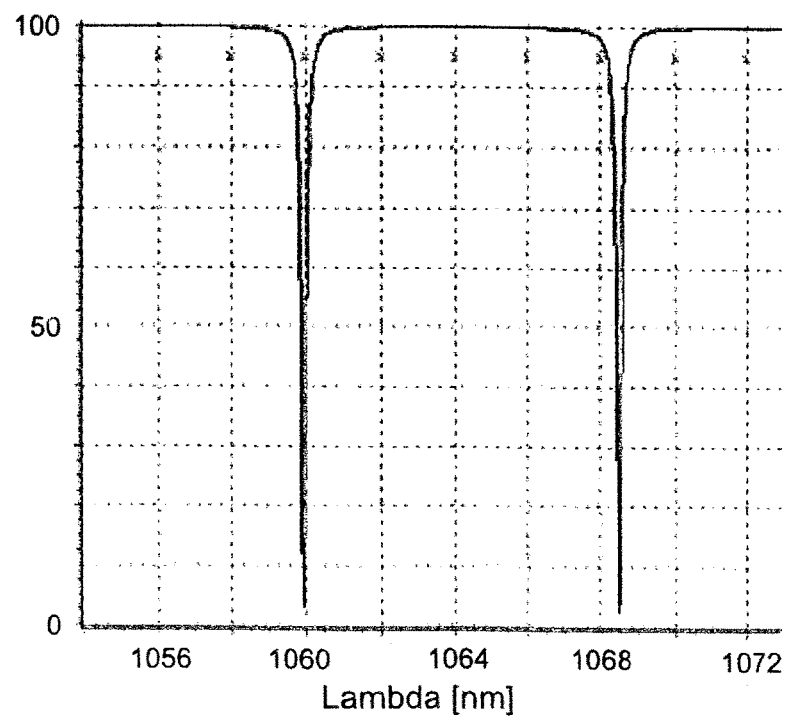

The results of the calculation of the reflectivity in % depending on the wavelength are depicted in FIGS. 7 and 8 for the polarization parallel to the ordinary ray and parallel to the extraordinary ray. From FIG. 7, it is possible to see that the reflectivity of the system collapses at a wavelength of approximately 1064 nm, i.e. the amplification wavelength of the material of the laser crystal. This corresponds to a resonance in the resonator for a laser beam decoupled with this wavelength. The adjacent resonances occur at wavelengths of approximately 1056 nm and 1072 nm. Thus, the "free spectral range" is approximately 8 nm.

FIG. 8 shows resonances for the polarization in the direction of the extraordinary ray. The resonances closest to the amplification wavelength of 1064 nm lie at approximately 1060 nm and 1068 nm, i.e. have the greatest possible distance from 1064 nm.

In the case of the laser crystal 2 having a thickness D of 33.25 μm, corresponding to the length L of the resonator 1 in the considered layer system, L/(Lambda/ne)=67.5 emerges for the polarization in the direction of the extraordinary ray, i.e. the wavelength fits 67.5 times into the laser crystal (corresponding to the mode number of m=135). L/(Lambda/no)=61.25 emerges for the polarization in the direction of the ordinary ray, i.e. the mode number m would equal 122.5, which is not an integer mode number as there is no valid mode for the polarization in the direction of the ordinary ray at the amplification wavelength, as desired. Hence, a phase shift between the ordinary ray and the extraordinary ray of π/2 emerges for the thickness D of the laser crystal of 33.25 μm in the case of a passage through the laser crystal 2.

Figure 9:
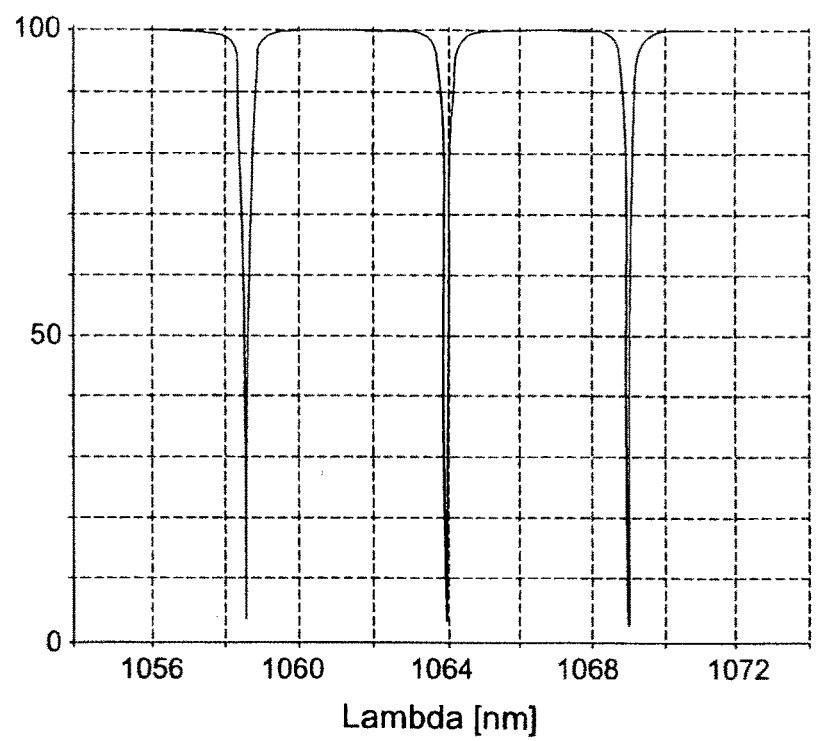
FIGS. 9 and 10 show diagrams corresponding to FIGS. 7 and 8 for a thickness of the laser crystal not according to the invention, as a comparison example.
Figure 10:
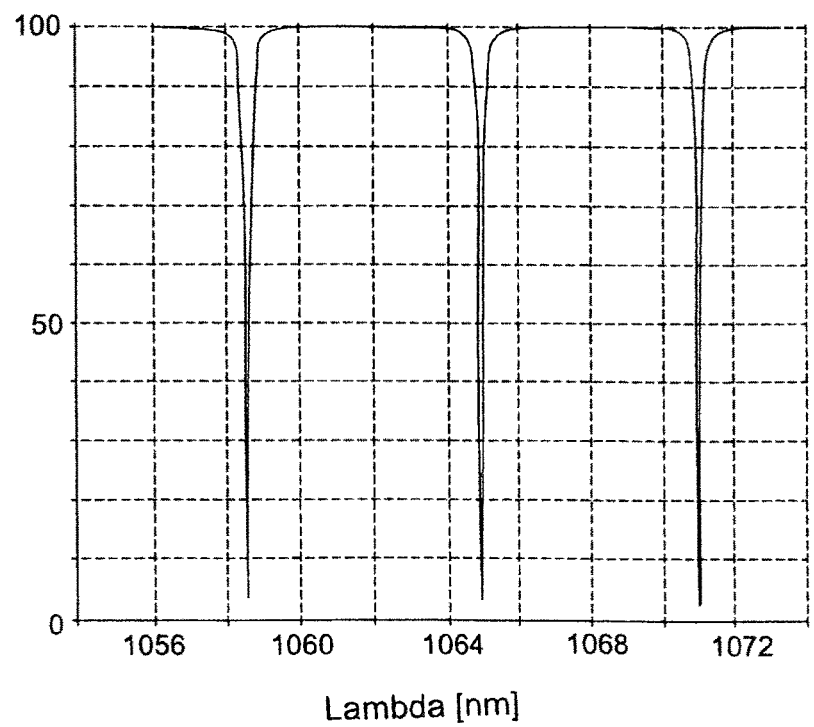

FIGS. 9 and 10 show diagrams in accordance with FIGS. 7 and 8 for a comparison example, in which the laser crystal has a thickness of 49.998 μm. There once again is a resonance at 1064 nm for the polarization in the direction of the extraordinary ray, as desired. For the polarization in the direction of the ordinary ray, the resonance closest hereto lies at approximately 1065 nm in this case. The distance is therefore too small in the case of this thickness D of the laser crystal for a stable operation of the laser to set in with the desired polarization parallel to the extraordinary ray.

Hence, for the purposes of determining a suitable thickness of the laser crystal for stable operation of the laser at one of the polarization directions, it is necessary, firstly, for the condition to be satisfied that the resonator has a resonance at the laser wavelength corresponding to the amplification wavelength for the desired polarization direction corresponding to the extraordinary or ordinary ray. Secondly, it is necessary to satisfy the condition that the phase shift for the polarization directions in accordance with the extraordinary ray and ordinary ray lies in the above-described range.

In the specifically described example, the polarization was selected in accordance with the extraordinary ray and the polarization at right angles thereto was suppressed. This is advantageous for Nd3+:YVO4 because there is greater amplification for the polarization direction corresponding to the extraordinary ray than is present for the polarization direction at right angles thereto. However, a polarization direction corresponding to the ordinary ray may be selected in analogous fashion and the polarization direction in accordance with the extraordinary ray may be suppressed.

Different modifications of the illustrated example embodiments are conceivable and possible without departing from the scope of the invention, for example in view of the layered construction of the resonator and in view of the birefringent material of the laser crystal. In advantageous embodiments of the invention, the birefringent material of the laser crystal only has one crystal optical axis (=optically uniaxial crystal), but it could also have more than one crystal optical axis, wherein the axes of the laser beam in the laser crystal and the laser beam axis of the decoupled laser beam may lie at right angles to one of the crystal optical axes.

LIST OF REFERENCE SIGNS

1 Resonator
2 Laser crystal
3 End surface
4 End surface
5 First end mirror
6 Second end mirror
7 Absorber layer
8 Reflection layer
9 Laser beam
10 Pumping radiation
11 Optical waveguide
12 Laser beam axis
16 Light beam
17 Ordinary ray
18 Arrow
19 Extraordinary ray
20 Cross
21 Carrier substrate
22 YVO4 crystal
23 Lens
24 Lens
25 Beam splitter
26 Cooling body
27 Window
30 Line
31 Line
32 Line
35 a-axis
36 a-axis
37 c-axis

The invention claimed is:

1. A microchip laser comprising a monolithic resonator having a birefringent laser crystal, wherein a laser beam which has a laser wavelength and which is decoupled from the resonator that emerges from the resonator along a laser beam axis and a length (L) of the resonator in relation to a direction of the laser beam axis is shorter than 150 μm, the birefringent laser crystal has such a thickness (D) in relation to the direction of the laser beam axis that, in the case of an incidence on the birefringent laser crystal of a light beam which has the laser wavelength taking place in the direction of the laser beam axis, a phase shift lying in a range of $\pi/2 \pm \pi/4$ occurs between an ordinary ray and an extraordinary ray, into which the light beam is divided in the birefringent laser crystal, during a single passage through the birefringent laser crystal.

2. The microchip laser as claimed in claim 1, wherein the phase shift lies in the range of $\pi/2 \pm \pi/8$.

3. The microchip laser as claimed in claim 1, wherein the length (L) of the resonator in relation to the direction of the laser beam axis is ≤100 μm.

4. The microchip laser as claimed in claim 1, wherein the microchip laser is passively Q-switched, and a pulse length is less than 100 ps.

5. The microchip laser as claimed in claim 1, wherein end mirrors delimiting the resonator on both sides are planar, at least without pumping radiation incident on the resonator, and lie parallel to one another and at right angles to the laser beam axis.

6. The microchip laser as claimed in claim 1, wherein the laser beam axis is at right angles to a crystal optical axis of the birefringent laser crystal.

7. The microchip laser as claimed in claim 1, wherein the birefringent laser crystal is a vanadate.

8. The microchip laser as claimed in claim 1, wherein the length (L) of the resonator in relation to the direction of the laser beam axis is less than 30% greater than the thickness (D) of the birefringent laser crystal in relation to the direction of the laser beam axis.

9. The microchip laser as claimed in claim 1, wherein, in the case of a single passage, there is a phase shift of less than $\pi/8$ between a light beam which has the laser wavelength and is polarized in a direction of the ordinary ray and a light beam which has the laser wavelength and is polarized in a direction of the extraordinary ray as a result of layers in the resonator which are present in addition to the birefringent laser crystal.

10. A method for forming a microchip laser comprising a monolithic resonator having a birefringent laser crystal, wherein a laser beam which has a laser wavelength and which is decoupled from the resonator emerges from the resonator along a laser beam axis and a length (L) of the resonator in relation to a direction of the laser beam axis is shorter than 150 μm, the method comprising providing that the resonator has a resonance in the laser crystal at the laser wavelength for a desired polarization direction corresponding to an extraordinary ray or ordinary ray, and for an incidence of a light beam which has the laser wavelength on the birefringent laser crystal occurring in the direction of the laser beam axis, calculating a phase shift between the ordinary ray and the extraordinary ray, into which the light beam is divided in the laser crystal, for a single passage through the birefringent laser crystal and selecting a thickness (D) of the laser crystal in relation to the laser beam axis in such a way that the phase shift lies in a range of $\pi/2 \pm \pi/4$.

11. The microchip laser as claimed in claim 1, wherein the birefringent laser crystal has only one crystal optical axis, in respect of which the birefringent laser crystal is optically isotropic.

12. The microchip laser as claimed in claim 1, wherein the laser crystal is Nd3+:YVO4.

* * * * *